(12) United States Patent
Cui et al.

(10) Patent No.: US 9,763,152 B2
(45) Date of Patent: Sep. 12, 2017

(54) METHOD AND DEVICE FOR CONTROLLING THE FUSION OF A HETEROGENEOUS SYSTEM

(71) Applicant: Beijing University of Posts and Telecommunications, Beijing (CN)

(72) Inventors: Qimei Cui, Beijing (CN); Xiaofeng Tao, Beijing (CN); Yulong Shi, Beijing (CN); Yu Gu, Beijing (CN); Tianpeng Yuan, Beijing (CN)

(73) Assignee: Beijing University of Posts and Telecommunications (CN)

( * ) Notice: Subject to any disclaimer, the term of this patent is extended or adjusted under 35 U.S.C. 154(b) by 153 days.

(21) Appl. No.: 14/663,563

(22) Filed: Mar. 20, 2015

(65) Prior Publication Data

US 2015/0312797 A1 Oct. 29, 2015

(30) Foreign Application Priority Data

Apr. 28, 2014 (CN) .......................... 2014 1 0175704

(51) Int. Cl.
*H04W 28/02* (2009.01)
*H04W 36/12* (2009.01)
(Continued)

(52) U.S. Cl.
CPC ............. *H04W 36/12* (2013.01); *H04L 47/41* (2013.01); *H04L 69/14* (2013.01);
(Continued)

(58) Field of Classification Search
CPC ................. H04B 7/2121; H04B 7/2123; H04J 2203/0069; H04W 72/04; H04W 72/12; H04W 76/00; H04W 28/0231; H04W 28/0284; H04W 36/12; H04W 80/02; H04W 84/12; H04Q 2213/394; H04L 47/41; H04L 69/14
(Continued)

(56) References Cited

U.S. PATENT DOCUMENTS

2007/0160017 A1* 7/2007 Meier ................... H04W 36/18
370/338
2008/0144828 A1* 6/2008 Rofougaran .......... H04W 88/06
380/270

(Continued)

*Primary Examiner* — Chi H Pham
*Assistant Examiner* — Robert Lopata
(74) *Attorney, Agent, or Firm* — Lerner, David, Littenberg, Krumholz & Mentlik, LLP (57) ABSTRACT

A device for controlling the fusion of a heterogeneous system, which receives a first data stream from a MAC layer of a WLAN through a LLC sub-layer and a second data stream from a MAC layer of a cellular network through a PDCP and a RLC sub-layer, and for fusing the first data stream and the second data stream into one data stream and transmitting the fused one data stream to a network layer. The device demultiplexes the data stream from the network layer into a third data stream corresponding to the MAC layer of the WLAN and a fourth data stream corresponding to the MAC layer of the cellular network, and transmits the third data stream to the MAC layer of the WLAN through the LLC and the fourth data stream to the MAC layer of the cellular network through the PDCP and the RLC sub-layer.

12 Claims, 5 Drawing Sheets

(51) Int. Cl.
   *H04L 29/06* (2006.01)
   *H04L 12/891* (2013.01)
   *H04W 80/02* (2009.01)
   *H04W 84/12* (2009.01)
   *H04W 72/04* (2009.01)
(52) U.S. Cl.
   CPC ... *H04W 28/0231* (2013.01); *H04W 28/0284* (2013.01); *H04W 72/04* (2013.01); *H04W 80/02* (2013.01); *H04W 84/12* (2013.01)
(58) Field of Classification Search
   USPC .......................................................... 370/329
   See application file for complete search history.

(56) References Cited

U.S. PATENT DOCUMENTS

| | | | | |
|---|---|---|---|---|
| 2009/0131053 | A1* | 5/2009 | Sachs | H04W 36/0016 455/436 |
| 2012/0071168 | A1* | 3/2012 | Tomici | H04W 76/025 455/445 |
| 2013/0088983 | A1* | 4/2013 | Pragada | H04W 16/14 370/252 |
| 2013/0242897 | A1* | 9/2013 | Meylan | H04W 28/16 370/329 |
| 2014/0078906 | A1* | 3/2014 | Chen | H04L 69/18 370/237 |
| 2014/0092828 | A1* | 4/2014 | Sirotkin | H04W 52/0258 370/329 |
| 2014/0160937 | A1* | 6/2014 | Richards | H04W 12/06 370/236 |
| 2014/0211681 | A1* | 7/2014 | Chan | H04N 21/6405 370/312 |
| 2014/0348073 | A1* | 11/2014 | Elhaddad | H04W 72/08 370/329 |
| 2014/0355446 | A1* | 12/2014 | Altman | H04W 28/0289 370/235 |
| 2016/0081006 | A1* | 3/2016 | Reisslein | H04W 72/0453 370/329 |
| 2016/0212677 | A1* | 7/2016 | Chakraborty | H04W 40/02 |
| 2016/0255531 | A1* | 9/2016 | Stein | G06F 1/1632 |

* cited by examiner

METHOD AND DEVICE FOR CONTROLLING THE FUSION OF A HETEROGENEOUS SYSTEM

CROSS-REFERENCE TO RELATED APPLICATIONS

The present application claims priority from Chinese Application No. CN 201410175704.2, filed Apr. 28, 2014, the disclosure of which is hereby incorporated herein by reference.

TECHNICAL FIELD

The present disclosure relates to the technical field of telecommunication, and in particular to a method and a device for controlling the fusion of a heterogeneous system.

TECHNICAL BACKGROUND

As wireless communication develops, the cellular network across the world also develops rapidly. The deployment of 3G network has become mature, and 4G network is also on its way of rapid expansion. Cellular network is being massively constructed and expanded, and will continue to develop and coexist with the wireless local area network (WLAN) in the long term. The fusion of a cellular network and a WLAN is the future in the field of communication.

Therefore, the technical problem at present is how to realize the fusion of the cellular network and the WLAN.

SUMMARY OF THE INVENTION

According to an embodiment of the present disclosure, method and device for controlling the fusion of a heterogeneous system for realizing the fusion of a cellular network and a WLAN are provided.

In an embodiment according to the present disclosure, the following technical solutions are adopted.

A device for controlling the fusion of a heterogeneous system, comprising:

an uplink data multiplexing module, for receiving a first data stream from a media access control (MAC) layer of a wireless local area network (WLAN) through a logic link control (LLC) sub-layer and a second data stream from a media access control (MAC) layer of a cellular network through a packet data convergence protocol (PDCP) and a radio link control (RLC) sub-layer, and fusing the first data stream and the second data stream into one data stream and transmitting the fused one data stream to a network layer.

Optionally, the device further comprises:

a downlink data demultiplexing module for demultiplexing the fused one data stream from the network layer into a third data stream corresponding to the MAC layer of the WLAN and a fourth data stream corresponding to the MAC layer of the cellular network, and for transmitting the third data stream to the MAC layer of the WLAN through the LLC, and the fourth data stream to the MAC layer of the cellular network through the PDCP and the RLC.

Optionally, the device further comprises:

a cross-system resource mapping module for mapping the resource in the MAC layer of the WLAN and that in the MAC layer of the cellular network to virtual resources.

Optionally, the device further comprises:

a joint wireless access control module for covering a user device with both WLAN and cellular network, and when the user device requests to establish a radio bearer, for connecting the user device to the WLAN and/or the cellular network.

Optionally, the device further comprises:

a joint resource allocation module for allocating virtual resource to the user device based on the requirement of the user device.

Optionally, the device further comprises a user plane, wherein the uplink data multiplexing module and the downlink data demultiplexing module are located at the user plane.

Optionally, the device further comprises a control plane for the joint resource allocation and the admission control of the WLAN and the cellular network.

A system for the fusion of a heterogeneous system comprises the above device for controlling the fusion of the heterogeneous system, wherein the device is located between the network layer and the MAC layer of the system for the fusion of the heterogeneous system.

A method for controlling the fusion of a heterogeneous system, comprising the steps of:

receiving a first data stream from a MAC layer of a WLAN through an LLC sub-layer, receiving a second data stream from a MAC layer of a cellular network through a PDCP and a RLC sub-layer, and fusing the first data stream and the second data stream into one data stream and transmitting the fused one data stream to a network layer.

Optionally, the method further comprises the steps of:

demultiplexing the data stream from the network layer into a third data stream corresponding to the MAC layer of the WLAN and a fourth data stream corresponding to the MAC layer of the cellular network, and transmitting the third data stream to the MAC layer of the WLAN through the LLC, and the fourth data stream to the MAC layer of the cellular network through the PDCP and the RLC.

Based on the above technical solutions, an embodiment of the present disclosure receives the first data stream from the MAC layer of the WLAN through the LLC sub-layer, and the second data stream from the MAC layer of the cellular network through a PDCP and the RLC sub-layer, fuses the first data stream and the second data stream into a data stream and transmits the fused data stream to the network layer. As a result, the fusion between the cellular network and the WLAN is realized.

BRIEF DESCRIPTION OF THE ACCOMPANYING DRAWINGS

For clearly explaining the technical solutions in the embodiments of the present disclosure or the prior art, the drawings with respect to these embodiments will be briefly described below. Obviously, the accompanying drawings described below show some embodiments of the present disclosure, from which one skilled in the art can acquire other drawings without any inventive attempt.

DETAILED DESCRIPTION OF THE EMBODIMENTS

In order to clarify the objective, technical solutions and the beneficial effects of the embodiments of the present disclosure, the technical solutions herein will be explained in detail with reference to the accompanying drawings in the embodiments. Obviously, the embodiments described herein constitute only a part of, not all of the embodiments of the present disclosure. Any other embodiments obtained by one skilled in the art based on the embodiments of the present disclosure without any inventive attempt all fall within the scope of the present disclosure.

Embodiment 1

Figure 1:
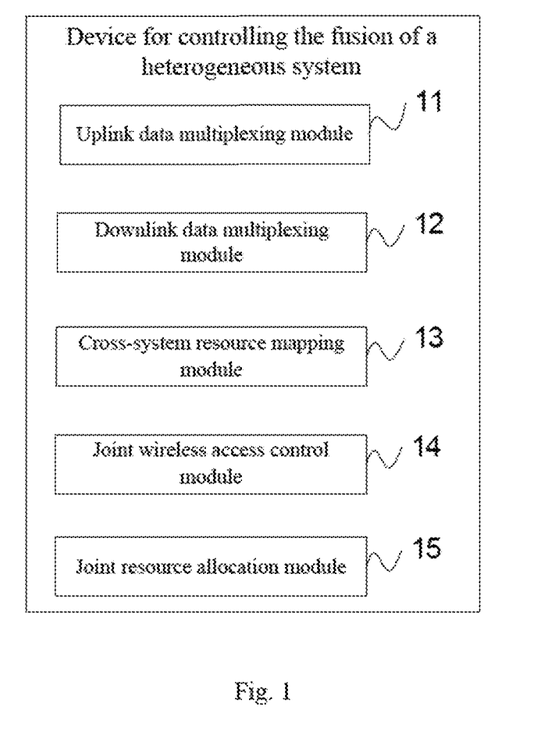
FIG. 1 schematically shows the structure of a device for controlling the fusion of a heterogeneous system according to an embodiment of the present disclosure, FIG. 2 schematically shows the frame structure of the device for controlling the fusion of a heterogeneous system according to an embodiment of the present disclosure, FIG. 3 schematically shows the mapping of RAT resources in the fusion of a cellular network and a wireless local area network according to an embodiment of the present disclosure, FIG. 4 schematically shows a new protocol stack for the fusion of a Long Term Evolution and the WLAN according to an embodiment of the present disclosure.

As shown in FIG. 1, the present example provides a device for controlling the fusion of a heterogeneous system, comprising:

an uplink data multiplexing module 11, for receiving a first data stream from a media access control (MAC) layer of a wireless local area network (WLAN) through a logic link control (LLC) sub-layer and a second data stream from a MAC layer of a cellular network through a packet data convergence protocol (PDCP) and a radio link control (RLC) sub-layer, and for fusing the first data stream and the second data stream into one data stream and transmitting the fused one data stream to a network layer.

Optionally, as shown in FIG. 1, the device further comprises:

a downlink data demultiplexing module 12, for demultiplexing the data stream from the network layer into a third data stream corresponding to the MAC layer of the WLAN and a fourth data stream corresponding to the MAC layer of the cellular network, and for transmitting the third data stream to the MAC layer of the WLAN through the LLC, and the fourth data stream to the MAC layer of the cellular network through the PDCP and the RLC sub-layer.

Optionally, as shown in FIG. 1, the device further comprises:

a cross-system resource mapping module 13, for mapping the resource in the MAC layer of the WLAN and that in the MAC layer of the cellular network to virtual resources.

Optionally, as shown in FIG. 1, the device further comprises:

a joint wireless access control module 14, which is used for covering a user device with both WLAN and the cellular network. When the user device requests to establish a wireless bearer, the joint wireless access control module connects the user device to the WLAN and/or the cellular network.

Optionally, as shown in FIG. 1, the device further comprises:

a joint resource allocation module 15, for allocating virtual resource to the user device according to the requirement of the user device.

Optionally, the device further comprises a user plane. The uplink data multiplexing module and the downlink data demultiplexing module are located at the user plane.

Optionally, the device further comprises a control plane for the joint resource allocation and the admission control of the WLAN and the cellular network.

The present embodiment further provides a system for the fusion of a heterogeneous system, comprising said device for controlling the fusion of the heterogeneous system. The device is located between a network layer and a MAC layer of the system for the fusion of the heterogeneous system.

The present embodiment of the present disclosure receives the first data stream from the MAC layer of the WLAN through the LLC sub-layer, and the second data stream from the MAC layer of the cellular network through a PDCP and the RLC sub-layer, and fuses the first data stream and the second data stream into one data stream and transmits the fused one data stream to the network layer. As a result, the fusion between the cellular network and the WLAN is realized.

Embodiment 2

The present embodiment provides a method for controlling the fusion of a heterogeneous system, comprising the steps of:

receiving a first data stream from a MAC layer of a WLAN through an LLC sub-layer, receiving a second data stream from a MAC layer of a cellular network through a PDCP and a RLC sub-layer, and fusing the first data stream and the second data stream into one data stream and transmitting the fused one data stream to a network layer.

Optionally, the method further comprises the steps of:

demultiplexing the data stream from the network layer into a third data stream corresponding to the MAC layer of the WLAN and a fourth data stream corresponding to the MAC layer of the cellular network, and transmitting the third data stream to the MAC layer of the WLAN through the LLC, and the fourth data stream to the MAC layer of the cellular network through the PDCP and the RLC.

The method of the present embodiment receives the first data stream from the MAC layer of the WLAN through the LLC sub-layer, and the second data stream from the MAC layer of the cellular network through the PDCP and the RLC sub-layer, fuses the first data stream and the second data stream into one data stream and transmits the fused one data stream to the network layer. As a result, the fusion between the cellular network and the WLAN is realized.

Embodiment 3

In the present embodiment, a solution for the fusion of a cellular network and a WLAN is adopted. The solution enables a base station to have not only the functions of a radio access network (RAN) of a cellular network and that of a WLAN, but also the ability of joint resource allocation by means of a novel architecture of protocol stack. As compared with a traditional architecture, the novel protocol stack according to the present embodiment includes a device for controlling the fusion of a heterogeneous system which is arranged between a network layer and a MAC layer for managing the two radio access technologies (RATs) jointly. The solution for the fusion of the cellular network and the WLAN according to the embodiment of the present disclosure can provide clients with united resource optimization and customized services in the future mobile communication and converged network.

Because the cellular network and the WLAN respectively work on different protocol stacks, the embodiment of the present disclosure applies a converged protocol stack. A converged base station (CBS) working under the above new protocol stack can manage the two RATs jointly.

Figure 2:
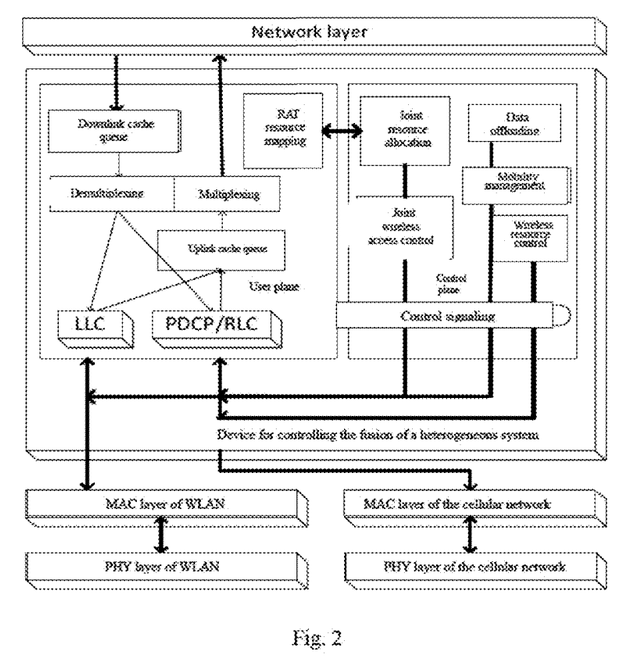

The fusion of the protocol stacks is realized by arranging a device for controlling the fusion of a heterogeneous system below the network layer and above the MAC layer, as shown in FIG. 2.

The device for controlling the fusion of the heterogeneous system has the following functions. The device enables an uplink data multiplexing and a downlink data demultiplexing between different RATs, and realizes the joint scheduling and control of resources between different RAN systems, and supports the fusion and expansion of more RATs. In this layer, the data stream from the MAC layer of the WLAN passes through the LLC sub-layer and the data stream from the MAC layer of the cellular network passes through the PDCP and the RLC sub-layer. The device fuses these two links into one link at a RAT multiplexing control module which will be transmitted to the network layer. As such, an IP packet from the network layer is demultiplexed through the RAT and divided into two links which are respectively transmitted to the MAC layer of the WLAN and that of the cellular network respectively through the LLC sub-layer and the PDCP/RLC sub-layer.

In this way, the CBS for the protocols according to an embodiment of the present disclosure has not only resource scheduling of fine granularity and shorter handoff delay, but also lower operation complexity. Since the CBS is located between the network layer and the MAC layer, where the underlying protocol will not be altered, the RANs each can be kept independent from one another, the CBS can not only have better compatibility with the existing system and be compatible with an existing cellular network/WLAN multimode mobile terminal, and in the meantime supports the expansion of new RATs. The functions of the RLC sub-layer and the LLC sub-layer are relatively simple, including basic functions such as segmentation and reassembly, and automatic repeat request (ARQ), etc, and the RLC sub-layer is the direct interface to the device for controlling the fusion of the heterogeneous system, and thus the complexity of the fusion thereof is not high. Therefore, by arranging these sub-layers in the device for controlling the fusion of the heterogeneous system, two data packets of different levels, including a data packet of the IP layer and that of the RLC sub-layer can be simultaneously processed by the device for controlling the fusion of the heterogeneous system, thereby the scheduling and processing can be more flexible.

An embodiment according to the present disclosure realizes a fusion of the RATs of two different systems in a device for controlling the fusion of the heterogeneous system at the third layer. The device for controlling the fusion of the heterogeneous system will be described in detail.

The functions of the device for controlling the fusion of the heterogeneous system will be described from the perspectives of a user plane and a control plane respectively, as shown in FIG. 2.

The user plane of the device for controlling the fusion of the heterogeneous system is designed to map the IP packet sent from a core network orderly onto a corresponding RAT sub-layer, and transmit it to a user under the cross-system condition. The user plane merges uplink data transmitted by the user through different RATs into a unified IP flow and transmits the IP flow to the core network. The user plane mainly comprises the following functional modules, such as a RAT multiplexing/demultiplexing functional module, a cross-system resource mapping module, an uplink/downlink cache queue management module, and an underlying bearer module.

RAT multiplexing/demultiplexing functional module

When a user device under a CBS establishes a plurality of RAT connections, what the network side is only needed to do is to assigns one IP address to the user. The IP packets from the core network is differentiated at the layer of the device for controlling the fusion of the heterogeneous system based on the service types thereof, so that they are assigned to different RATs to be sent out. Data streams from different RATs multiplex at the layer of the device for controlling the fusion of the heterogeneous system into a unified data stream, and is transmitted to the network layer.

Uplink

The user device determines which RAT is to bear the data stream to be sent to the CBS through an application layer protocol or a transport layer protocol of the terminal, and transmits the data stream to an end of the CBS through a corresponding link of the cellular network or that of the WLAN. The layer of the device for controlling the fusion of the heterogeneous system takes the user's IP address as the source IP address, so as to package the data packets from two RAT sub-layers, and multiplexes two data streams into one IP flow, and then sends out the IP flow.

Downlink

The layer of the device for controlling the fusion of the heterogeneous system configures a RAT registry according to the subscription of the user or the strategy of the service provider. The RAT registry comprises the user's IP address, different RATs, and the carried service types, and the like. For example, when a double-connection is established between a user and a base station, the base station can assign an IP address (10.168.1.1) to the user, and two different RATs respectively bear different services, i.e., the cellular network bears the voice service or real-time service, and the WLAN bears the video service or downloading service. The content of the registry can be altered according to the network status.

In particular, in the demultiplexing module of the device for controlling the fusion of the heterogeneous system, the basic service types of each IP packet can be determined through a technical of IP packet analysis and a mature deep packet inspection technology (DPI), wherein the IP packet is assigned to the corresponding RAT according to the services/RAT mapping table.

For the above reasons, the RAT multiplexing technology of the device for controlling the fusion of the heterogeneous system assigns the data packet to the corresponding RAT according to the service types in the RAT registry, wherein the two RATs are transparent to the user, and can be customized according to the services for the user, so as to guarantee the quality of experience (QoE).

Cross-System Resource Mapping Module

Figure 3:
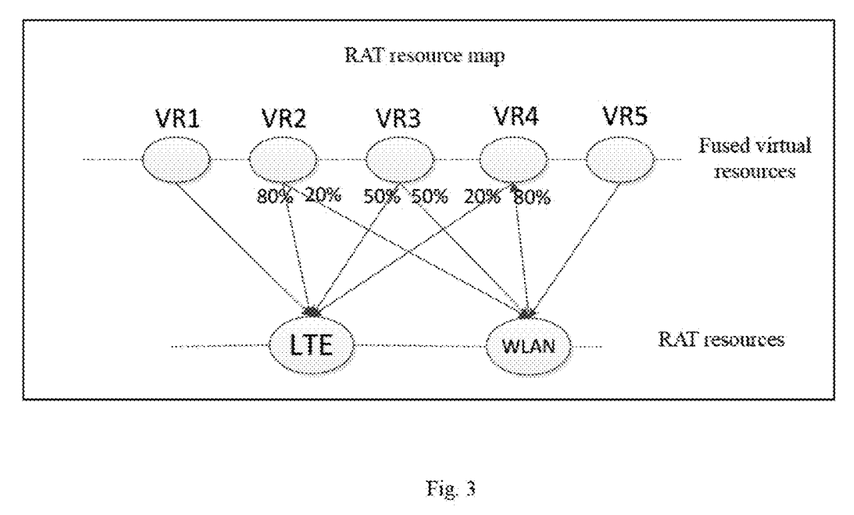

A cross-system resource mapping module is mainly responsible for mapping two different RAT resources in the bottom layer onto logically virtual resources for the CBS to perform a resource scheduling. The present disclosure provides a mapping method as shown in FIG. 3, wherein the resources of the two access methods of the cellular network and the WLAN are mapped onto unified virtual resources VR1, VR2, VR3, VR4, and VR5 respectively representing five types of resources. VR1 comprises cellular network resource only, and thus is suitable to be assigned to a single link user of the cellular network. Similarly, VR5 comprises WLAN only, and thus is suitable to be assigned to a single link user of the WLAN. Since other virtual resources each can comprise different proportions of the cellular network resource and the WLAN resource and have services of different data volumes, delays, and requirements of QoS, the device for controlling the fusion of the heterogeneous system can allocate these virtual resources freely.

In this case, with the device for controlling the fusion of the heterogeneous system, a logically single resource scheduling can be realized and physical resources of two RATs can be assigned to the user jointly. Which RAT or which plurality of RATs bears the services for the user device is transparent to the user, thereby the fusion of different RAT resources can be realized.

Uplink and Downlink Cache Queue Management.

In downlink transmission, when arriving at the device for controlling the fusion of the heterogeneous system, the IP data stream from the core network needs to be demultiplexed. In order to prevent the loss of data and secure the data to be reasonably and orderly processed, a downlink cache is configured. The IP packets arrived are waiting for processing according to a certain order, as shown in FIG. 1. According to the services, or levels of different user devices, the priorities of the IP packets are different in the queue, so that the IP packet having the highest requirement for delay can be processed first.

In uplink transmission, data from different RATs needs to be processed by the multiplexing module of the device for controlling the fusion of the heterogeneous system into a unified IP stream to be sent out. The data from the WLAN and that from the cellular network waits in a cache zone for processing, as shown in FIG. 1. The processing order of different RATs can be based upon their priorities or polling.

The status of the uplink and downlink cache queue can be reported to the resource scheduling module and IP packet multiplexing/demultiplexing module of the control plane, so that the resource scheduling strategy can be adjusted according to the status of the data queue, thereby packet loss at the IP packet multiplexing/demultiplexing module of the device for controlling the fusion of the heterogeneous system can be prevented and the optimization of resource allocation can be realized.

Underlying Bearer

Herein, a PDCP/RLC sub-layer of the cellular network and an LLC sub-layer of the WLAN are configured in the device for controlling the fusion of the heterogeneous system, which can provide not only functions such as encryption, compression, packaging, segmentation, reassembly, and ARQ, etc., but also interfaces for the bottom layer.

Design of the Control Plane

The control plane of the device for controlling the fusion of the heterogeneous system is mainly responsible for the management of the joint resource scheduling and admission control of two RATs, so as to solve the problem of cross-system data offloading and user switching, thereby improving service quality for the users. The control plane mainly comprises the following functional modules: a joint wireless access control, a joint resource allocation module, a data offloading and mobility management module, and a radio resource control (RRC) module.

Joint Wireless Access Control

Under the condition of coverage by both a WLAN and a cellular network, when a user requests to build a new radio bearer, the wireless access control module evaluates to allow or to reject the access, and determines to which of the RATs in the WLAN/cellular network the user device can have access, or to allow the user device to access to both systems. In this case, the QoS for the user can be guaranteed, as shown in FIG. 1.

The wireless access control aims to guarantee that the user initiating the request can utilize a plurality of RAT wireless resources efficiently and optimally, and in the mean time, demand of QoS in session is satisfied.

The wireless access control strategy can be either simple WLAN first principle, or the principle of randomly reserving partial resource of two RAT resources. In order to optimize the access control, the present disclosure provides a solution for reference, i.e., an access control strategy of simultaneously considering the statuses of the user and the network.

The following factors should be taken into account when any decision is made, including 1. with respect to user end, the priority of the user and the requirement of QoS of new session, etc.; and 2. with respect to network end, the network load, throughput of the network, link quality, service condition of each RAT resource, and the requirement of QoS of the ongoing session. In addition, related algorithm for the device for controlling the fusion of the heterogeneous system, such as the game theory and the measurement of user demand and network status, should be considered, so as to make the optimal decision.

The decision from the device for controlling the fusion of the heterogeneous system is delivered to the radio bearer of the cellular network/WLAN and admits the user to access to a certain RAT, or establishes a corresponding session connection through signaling.

Joint Resource Allocation

As shown in FIG. 1, main functions of the joint resource allocation relates to a virtual resource mapping module in the user plane of the device for controlling the fusion of the heterogeneous system. Virtual resource (VR) is allocated to the user by the joint resource allocation module based on the requirements of QoS, subscription of the user, priority level of the user, quality of the current channel, and the disturbance, etc., so as to guarantee the quality of experience (QoE) of the user.

When only the link of the cellular network or that of the WLAN builds a link with the user, the device for controlling the fusion of the heterogeneous system assigns VR1 or VR5 to the user. When the link is a dual-link comprising the cellular network and the WLAN, the device for controlling the fusion of the heterogeneous system performs a semi-static allocation. In this case, the device determines which VR is to be allocated to the user. According to the QoS, the subscription of the user and the disturbance condition, the device allocates VR2, VR3, or VR4 to the user. After deciding which VR is to be allocated, the percentage of each of the resources in the VR block is determined through polling or proportional fairness algorithm, as shown in FIG. 3.

Data Offloading and Mobility Management

When changes occur to different RAT loads at the network terminal, it is necessary for the device for controlling the fusion of the heterogeneous system to perform a cross-RAT load balancing, so that the resources can be allocated dynamically and specifically.

When the user moves within a heterogeneous network having a CBS, it is necessary for the device for controlling the fusion of the heterogeneous system to perform a handoff between a cell and a RAT on the user, so as to guarantee the continuity of the session.

Radio Resource Control (RRC) Module

Except for the mobility management function, most control functions included in RRC are peculiar to the cellular network, and cannot act as control functions in a fused network. RRC comprises functions including broadcasting, paging, RRC connection management, radio bearer control, control of report on user measurement, QoS management, transmitting NAS signaling, etc, as shown in FIG. 2.

The technical solutions of the present disclosure have the following beneficial effects as compared with the prior art:

1. Traditional fusion only refers to a fusion at the level of the network elements in the core network, which develops limited effects of heterogeneous cooperation. The technical solution according to the present disclosure can not only realize tighter fusion at deeper layer, but also enable a more efficient and finer cooperation between systems and cross-system optimization.

2. The present disclosure merges two separately operating base station systems of the cellular network and WLAN into one multimode base station. In this case, the base station can be managed in a unified manner by an EPC core network, and thus be operated by the provider according to the registry thereof and the subscription services of the user.

3. After the solution of the present disclosure is implemented, the control function and data function of the cellular network and those of the WLAN are gathered in one set of protocol. In this case, the cross-system cooperation transforms into resource allocation and joint control within a system, so that an optimal network solution on account of the QoS for the user can be provided. In the meantime, as for the problem of offloading and mobility management in the fusion of a heterogeneous system, the solution of the present disclosure can realize finer offloading and shorter handoff delay as compared with the prior art.

Embodiment 4

Figure 4:
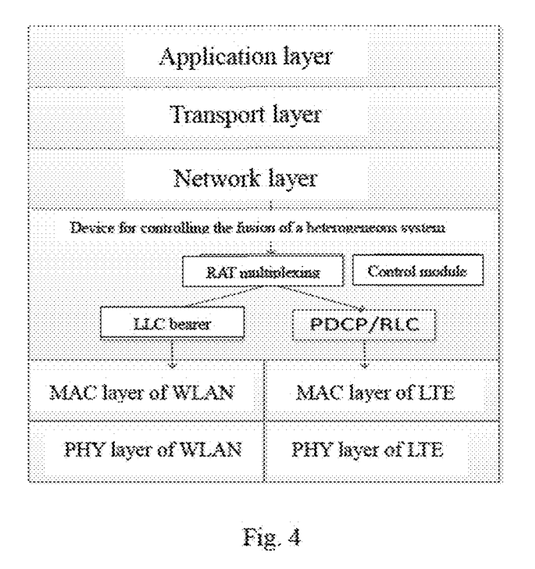

In this embodiment, the fusion of a long term evolution (LTE) network and a WLAN will be described in detail. The solution of fusing the cellular network and the WLAN is applied to the 4G wireless communication technology. Herein, the scenario of the fusion between the LTE and the WLAN, as well as the frame work of the protocol stack of the converged base station thereof will be discussed, as shown in FIG. 4. In order to illustrate the objective and technical solutions of the present disclosure more clearly, example 4 will be described in detail with reference to the following specific implementing steps.

A. Uplink Fusion

The control of the fusion of the uplink of a heterogeneous system is completed by the user and the base station collaboratively. In order to improve the compatibility of the system with the user, the client protocol should be modified as little as possible, and the control signaling overhead should be reduced. Moreover, it is determined by the user that which RAT the uplink data travels through.

Figure 5:
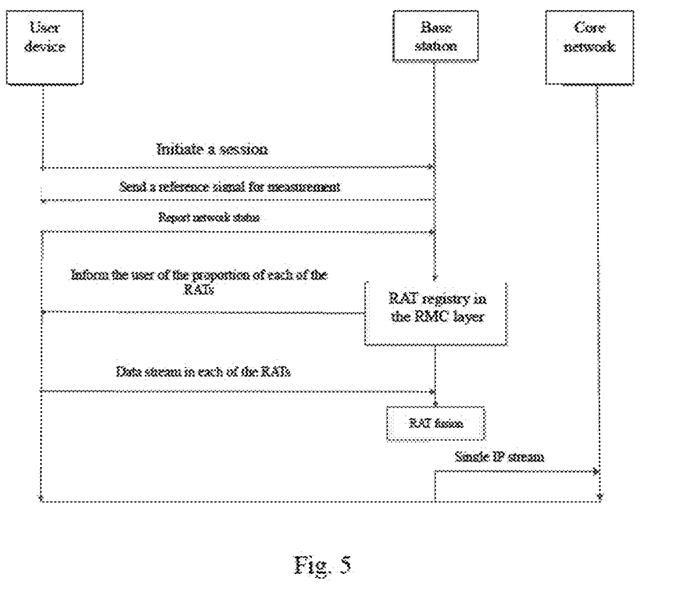
FIG. 5 shows a flow chart of an uplink in the fusion of the cellular network and the WLAN according to an embodiment of the present disclosure.

The process of an uplink RAT multiplexing is as shown in FIG. 5, and the specific implementing steps thereof are as follows.

Step A: a user initiates a request for a new session.

Step B: a base station measures the network status (channel quality, RAT load), and determines the proportion of LTE resource and that of WLAN resource occupied by the user data during transmission according to an uplink resource allocation algorithm, and informs the user through control signaling. In order to reduce delay and load caused by frequent signaling, only when necessary does the base station inform the user of the adjustment of the allocation of the data packet level. Of course, the user can realize the above functions by arranging corresponding software in the network layer.

Step C: the user end decides on its own which data to be sent through which RAT based on the notice from the base station.

Step D: finally, the data in two RAT uplinks arrive at the device for controlling the fusion of the heterogeneous system of the base station, and are fused together using RAT multiplexing technology of the user plane to be sent out through the core network.

Downlink Fusion

Downlink RAT demultiplexing enables the downlink data offloading to be decomposed into a unit up to IP packet by means of a fine regulation by the base station side. Since the amount of the downlink data is usually large, it can significantly influence the network load. In addition, the device for controlling the fusion of the heterogeneous system is designed such that distribution of the downlink data can be facilitated. It should be noted that the distribution of the data selected between the LTE and the WLAN (single link/dual link) when a user initiates a session is realized through the radio access control module of the control plane of the device for controlling the fusion of the heterogeneous system.

Figure 6:
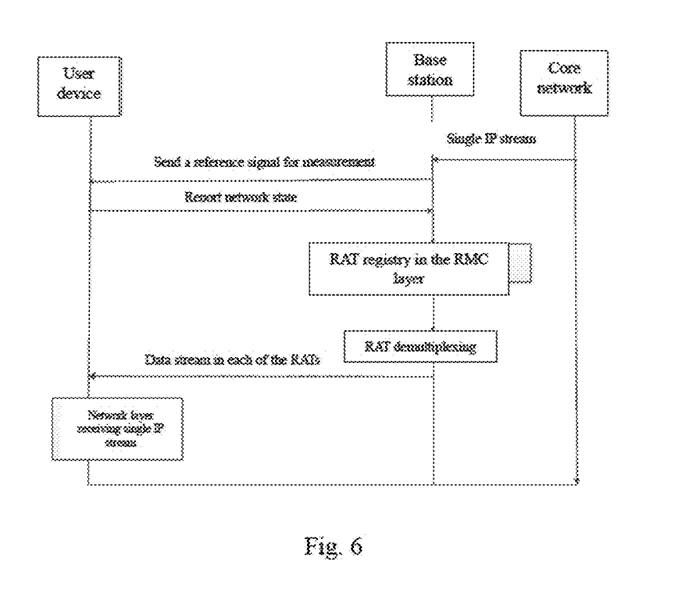
FIG. 6 shows a flow chart of a downlink in the fusion of the cellular network and the WLAN according to an embodiment of the present disclosure, FIG. 7 schematically shows a new protocol stack for the fusion of a Wideband Code Division Multiple Access and the WLAN according to an embodiment of the present disclosure, and FIG. 8 schematically shows a new protocol stack for the fusion of the Long Term Evolution, the WLAN and the Wideband Code Division Multiple Access according to an embodiment of the present disclosure.

The fusion of a downlink is as shown in FIG. 6, and the specific implementing steps thereof are as follows.

Step A: the base station measures the channel quality and the RAT load through the periodic network status.

Step B: the base station determines whether it is necessary to adjust the proportion of the the IP traffic distribution through a downlink RAT demultiplexing control algorithm, so as to achieve more refined IP traffic distribution.

Step C: In default, when data traffic distribution occurs, the RAT demultiplexing module performs a demultiplexing mapping according to the RAT registry; or writes the proportions of certain services respectively distributed between the two RAT by changing the RAT selection registry based on the customization of the user. Then, the RAT demultiplexing module performs demultiplexing based on the newly written-in proportions on distribution.

Step D: An IP packet is offloaded by the device for controlling the fusion of the heterogeneous system, and then sent to the user through a corresponding RAT. The above process is transparent to the user and requires no cooperation from the user. Because a user has only one IP address, the network layer of the user terminal can receive the IP packets from two RATs in a unified manner.

The multiplexing of the uplink RAT and the downlink RAT can be triggered by events of network load change (regular monitoring on the network status), or initiated by the base station periodically. The multiplexing of the uplink RAT and the downlink RAT are detailed resource allocation, which, together with the coarse resource allocation by the control plane of the device for controlling the fusion of the heterogeneous system, can realize joint optimization of cross-RAT resource.

Embodiment 5

Figure 7:
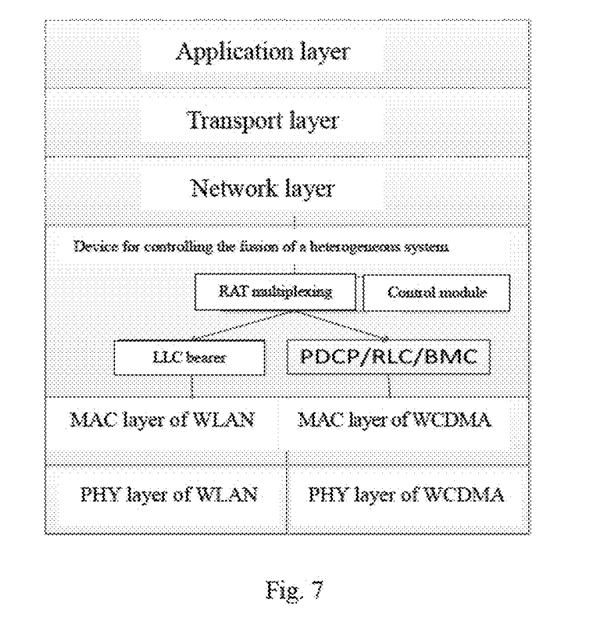

The fusion of WCDMA and WLAN will be illustrated in detail in this example. The solution for the fusion of the cellular network and the WLAN is applied to 3G wireless communication technologies, such as WCDMA, CDMA2000, and TD-CDMA, etc. Herein, only the fusion of WCDMA and WLAN will be illustrated. Other 3G technologies work under the same principles as WCDMA, and thus will remain general. The framework of the protocol stack of the CBS thereof is as shown in FIG. 7. In a fusion layer of the device for controlling the heterogeneous system, a data stream from the MAC layer of the WLAN passes through the LLC sub-layer and a data stream from the MAC layer of the WCDMA passes through the PDCP, RLC and the broadcast/multicast control (BMC) sub-layer. These two links are finally fused into one link at the RAT multiplexing control module. The fused data packet is sent to the network layer in a unified manner. Similarly, an IP packet from the network layer is divided into two links through RAT demultiplexing, which are respectively sent to the MAC layer of the WLAN through the LLC and the MAC layer of the WCDMA through the PDCP/RLC/BMC. The specific implementing steps of this embodiment are substantially the same as those of embodiment 1, as shown in FIGS. 5 and 6.

Embodiment 6

In the present embodiment, the fusion of LTE, WCDMA, and WLAN will be described in detail. Under the condition that 3G communication systems, such as WCDMA, CDMA2000 and TD-CDMA remains, and LTE and WLAN coexist with the 3G heterogeneous systems over prolonged period of time, the fusion of RATs is happening everywhere. Herein, the fusion of LTE, WCDMA and WLAN will be illustrated.

Figure 8:
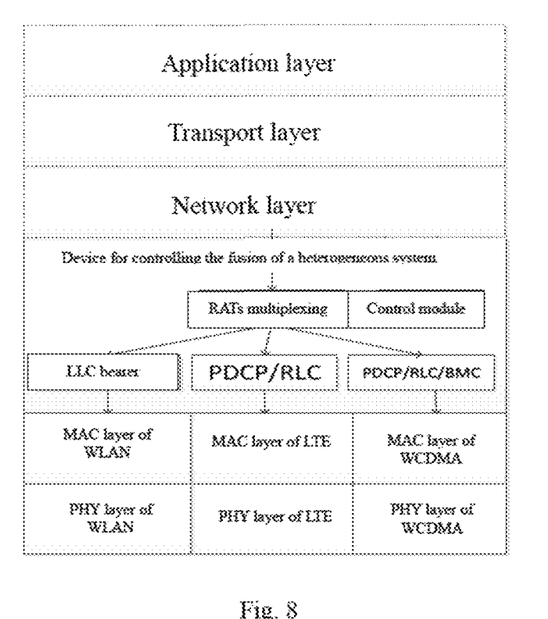

The protocol stack of a CBS is as shown in FIG. 8. In the protocol stack, the device for controlling the fusion of the heterogeneous system is located at the third layer. In the third layer, because there are three different RATs, the RATs are demultiplexed into three links which transmit data respectively to the MAC layer of the WLAN, that of the LTE, and that of the WCDMA.

In the meantime, in a cross-system resource mapping, three different RAT resources at the bottom layer are mapped onto logically virtual resources for the CBS to perform a resource scheduling. In this case, a solution of mapping resources of three access methods, namely LTE, WLAN, and WCDMA, onto unified virtual resources VR1 to VR16, which respectively represent sixteen types of resources. VR1 comprises LTE resource only, and thus is suitable to be assigned to a single link user of LTE. VR2 comprises WLAN resource only, and thus is suitable to be assigned to a single link user of WLAN. VR3 comprises WCDMA resource only, and thus is suitable to be assigned to a single link user of WCDMA. VR4, VR5, and VR6 each comprise both LTE resource and WLAN resource, and thus can be assigned to a dual link user in different proportions. VR7, VR8, and VR9 each comprise both WCDMA resource and WLAN resource, and thus can be assigned to a dual link user in different proportions. VR10 to VR16 each comprise all three RAT resources of different proportions, and have services of different data volumes, delays and QoS requirements. The device for controlling the fusion of the heterogeneous system can allocate the virtual resources freely. For specific implementing steps, please refer to the above embodiments as shown in FIGS. 5 and 6.

| VR/RAT | LTE | WLAN | WCDMA |
| --- | --- | --- | --- |
| VR1 | 100% | 0 | 0 |
| VR2 | 0 | 100% | 0 |
| VR3 | 0 | 0 | 100% |
| VR4 | 80% | 20 | 0 |
| VR5 | 50% | 50% | 0 |
| VR6 | 20% | 80% | 0 |
| VR7 | 0 | 80% | 20% |
| VR8 | 0 | 50% | 50% |
| VR9 | 0 | 20% | 80% |
| VR10 | 60% | 30% | 10% |
| VR11 | 60% | 10% | 30% |
| VR12 | 10% | 60% | 30% |
| VR13 | 30% | 60% | 10% |
| VR14 | 10% | 30% | 60% |
| VR15 | 30% | 10% | 60% |
| VR16 | 33.3% | 33.3% | 33.3% |

Various alterations and modifications can be made to the present disclosure by one skilled in the art without departing from the spirit and scope of the present disclosure. Therefore, under the condition that these alterations and modifications fall within the scope of the claims and that of the equivalent technology thereof, the present disclosure intends to comprise the alterations and modifications.

The invention claimed is:

1. A device for controlling the fusion of a heterogeneous system, comprising:
   an uplink data multiplexing module, for receiving a first data stream from a media access control MAC layer of a wireless local area network WLAN through a logic link control sub-layer LLC and a second data stream from a media access control layer MAC of a cellular network through a packet data convergence protocol PDCP and a radio link control sub-layer RLC, fusing the first data stream and the second data stream into one data stream, and transmitting the fused one data stream to a network layers
   a downlink data demultiplexing module, for demultiplexing the fused data stream from the network layer into a third data stream corresponding to the media access control MAC layer of the wireless local area network WLAN and a fourth data stream corresponding to the media access control MAC layer of the cellular network, and transmitting the third data stream to the media access control layer of the wireless local area network through the logic link control LLC, and the fourth data stream to the media access control layer of the cellular network through the packet data convergence protocol PDCP and the radio link control sublayer RLC: and
   a control plane for joint resource allocation and joint access control of the wireless local area network and the cellular network.

2. The device according to claim 1, wherein the device further comprises:
   a cross-system resource mapping module for mapping the resources of the media access control MAC layer of the wireless local area network WLAN and that of the media access control layer of the cellular network to virtual resources.

3. The device according to claim 1, wherein the device further comprises:
   a joint wireless access control module for covering a user device with both the wireless local area network and the cellular network, and when the user device requests to establish a new wireless bearer, enabling the user device to have access to the wireless local area network WLAN and/or the cellular network.

4. The device according to claim 1, wherein the device further comprises:
a joint resource allocation module, for allocating virtual resources to the user device according to the requirement of the user device.

5. The device according to claim 1, further comprising a user plane, wherein the uplink data multiplexing module and the downlink data demultiplexing module are located at the user plane.

6. The device for controlling the fusion of a heterogeneous system according to claim 1, wherein the device is located between the network layer and the media access control MAC layer.

7. The device for controlling the fusion of a heterogeneous system according to claim 1, wherein the device is located between the network layer and the media access control MAC layer.

8. The device for controlling the fusion of a heterogeneous system according to claim 2, wherein the device is located between the network layer and the media access control MAC layer.

9. The device for controlling the fusion of a heterogeneous system according to claim 3, wherein the device is located between the network layer and the media access control MAC layer.

10. The device for controlling the fusion of a heterogeneous system according to claim 4, wherein the device is located between the network layer and the media access control MAC layer.

11. The device for controlling the fusion of a heterogeneous system according to claim 5, wherein the device is located between the network layer and the media access control MAC layer.

12. The device for controlling the fusion of a heterogeneous system according to claim 1, wherein the device is located between the network layer and the media access control MAC layer.

* * * * *